(12) United States Patent
Sakamoto et al.

(10) Patent No.: US 7,325,936 B2
(45) Date of Patent: Feb. 5, 2008

(54) REARVIEW CORRECTING/CONTROLLING SYSTEM FOR VEHICLE

(75) Inventors: Hiroshi Sakamoto, Miyazaki (JP); Tomoyuki Kukita, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 11/417,270

(22) Filed: May 3, 2006

(65) Prior Publication Data

US 2006/0262432 A1 Nov. 23, 2006

(30) Foreign Application Priority Data

May 17, 2005 (JP) ............... 2005-143802

(51) Int. Cl.
*G02B 5/08* (2006.01)
*G02B 7/182* (2006.01)
*B60R 1/06* (2006.01)

(52) U.S. Cl. ............ 359/843; 359/877; 307/10.1; 701/301

(58) Field of Classification Search ............ 359/841, 359/843, 877; 307/10.1; 701/301
See application file for complete search history.

(56) References Cited

U.S. PATENT DOCUMENTS

| | | | | |
|---|---|---|---|---|
| 3,383,154 A | * | 5/1968 | Reed | .......... 359/843 |
| 4,746,206 A | * | 5/1988 | Kusztos et al. | .......... 359/555 |
| 5,530,651 A | * | 6/1996 | Uemura et al. | .......... 701/301 |
| 5,990,649 A | * | 11/1999 | Nagao et al. | .......... 318/568.1 |
| 6,229,263 B1 | * | 5/2001 | Izawa | .......... 315/80 |
| 6,351,698 B1 | * | 2/2002 | Kubota et al. | .......... 701/51 |
| 6,621,062 B1 | * | 9/2003 | Tamagawa et al. | .......... 250/206 |
| 6,686,869 B2 | * | 2/2004 | Kim | .......... 342/70 |
| 7,012,510 B2 | * | 3/2006 | Su et al. | .......... 340/436 |
| 2003/0160685 A1 | | 8/2003 | Su et al. | |

FOREIGN PATENT DOCUMENTS

| | | |
|---|---|---|
| EP | 1 338 473 A | 8/2003 |
| JP | 61-291242 | 12/1986 |
| JP | 2003-291729 | 10/2003 |
| KR | 2002055342 | * 7/2002 |
| TW | 448874 | * 11/1988 |
| WO | WO 2004/110817 | 12/2004 |

* cited by examiner

*Primary Examiner*—Ricky D. Shafer
(74) *Attorney, Agent, or Firm*—Carrier, Blackman & Associates, P.C.; Joseph P. Carrier; William D. Blackman

(57) ABSTRACT

A rearview correcting/controlling system for a vehicle includes: a rearview obtaining device for providing a rearview to an occupant on a driver's seat; a drive device for driving the rearview obtaining device to change a view angle of the rearview provided by the rearview obtaining device; and a control device for controlling the operation of the drive device. The control device controls the operation of the drive device to vertically change the view angle of the rearview obtaining device based on a value detected by a forward/rearward inclination detecting device. Thus, even when the forward/rearward inclination of the vehicle occurs, a rearview at an optimal view angle can be obtained.

8 Claims, 6 Drawing Sheets

REARVIEW CORRECTING/CONTROLLING SYSTEM FOR VEHICLE

RELATED APPLICATION DATA

Japanese priority application No. 2005-143802, upon which the present application is based, is hereby incorporated in its entirety herein by reference.

BACKGROUND OF THE INVENTION

1. Field of the Invention

The present invention relates to a rearview correcting/controlling system for a vehicle, comprising: rearview obtaining means for providing a rearview to an occupant on a driver's seat; drive means for driving the rearview obtaining means to change a view angle of the rearview provided by the rearview obtaining means; and control means for controlling the operation of the drive means.

2. Description of the Related Art

Japanese Patent Application Laid-open No. 2003-291729 discloses a rearview correcting/controlling system which is designed to provide a rearview at an appropriate view angle corresponding to the traveling state of a vehicle, by changing the angle of a rearview mirror in response to left-turning, right-turning, traveling lane change and the like.

Even if a vehicle is in a straight traveling state, the vehicle can be inclined forward/rearward with respect to a horizontal plane, when traveling on an uphill road or downhill road, or depending on the weight of passengers and load carried on the vehicle. In a state in which the rearview has been set at an appropriate view angle for traveling on a horizontal road surface, when the forward/rearward inclination of the vehicle as described above occurs, an occupant on a driver's seat cannot obtain an optimal rearview.

SUMMARY OF THE INVENTION

The present invention has been achieved with the above circumstances in view, and has an object to provide a rearview correcting/controlling system for a vehicle, the system providing a rearview at an optimal view angle even when a forward/rearward inclination of the vehicle occurs.

In order to achieve the above object, according to the present invention, there is provided a rearview correcting/controlling system for a vehicle, comprising: rearview obtaining means for providing a rearview to an occupant on a driver's seat; drive means for driving the rearview obtaining means to change a view angle of the rearview provided by the rearview obtaining means; and control means for controlling the operation of the drive means, wherein the system further includes forward/rearward inclination detecting means for detecting a forward/rearward inclination of the vehicle, and the control means controls the operation of the drive means so as to vertically change the view angle of the rearview obtaining means based on a value detected by the forward/rearward inclination detecting means.

With the above arrangement of the present invention, when the forward/rearward inclination detecting means detects that the vehicle has been inclined forward/rearward, the control means controls the drive means so that the rearview obtaining means is driven to vertically change the view angle of the rearview.

The above and other objects, features and advantages of the invention will become apparent from the following description of the preferred embodiments taken in conjunction with the accompanying drawings.

DETAILED DESCRIPTION OF PREFERRED EMBODIMENTS

Figure 1:
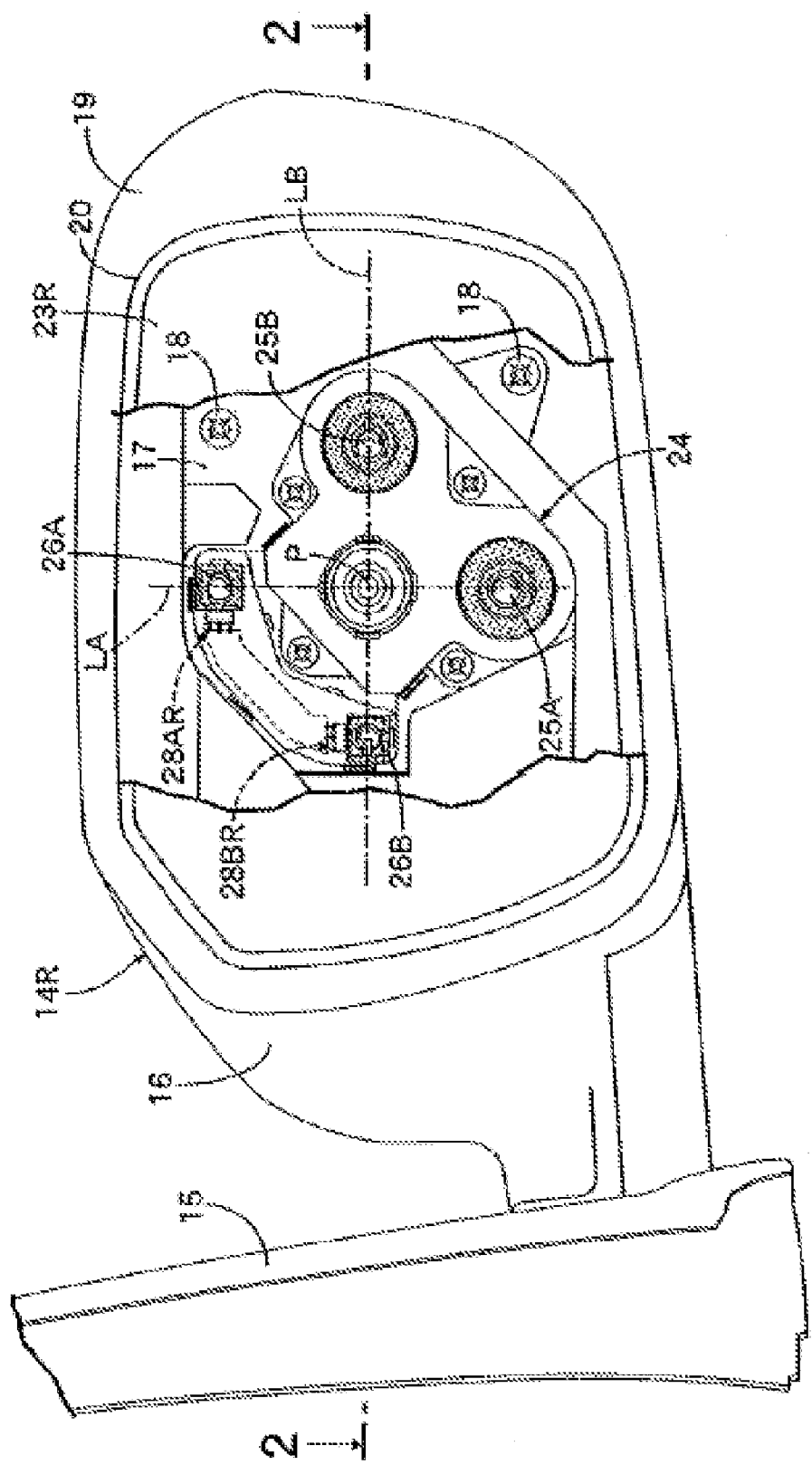
FIG. 1 is a partially cutaway front view of a door mirror assembly for a vehicle according to a first embodiment of the present invention, taken along a line 1-1 in FIG. 2.
Figure 2:
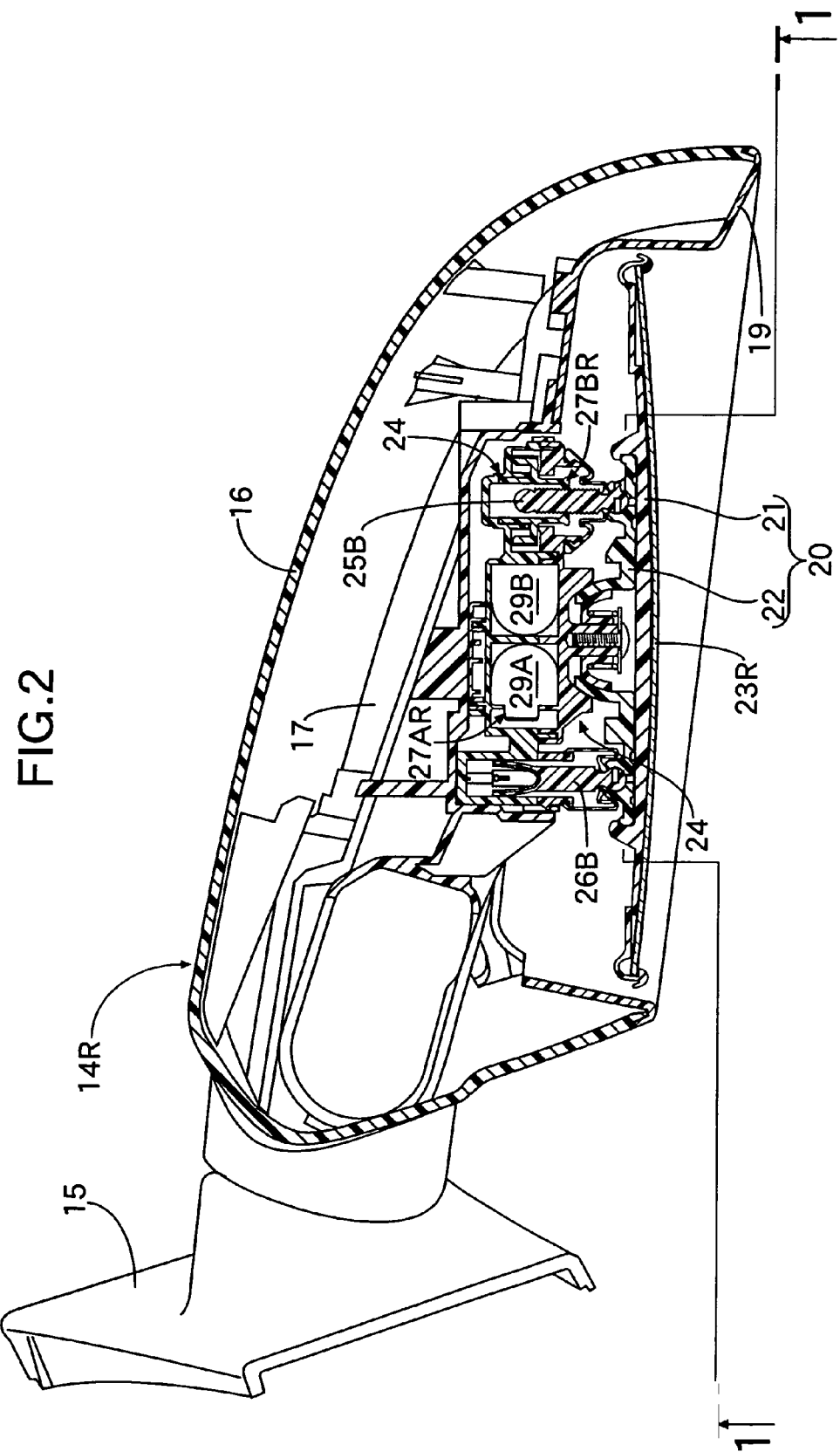
FIG. 2 is a sectional view taken along a line 2-2 in FIG. 1.

Referring first to FIGS. 1 and 2, a base 15 of a right door mirror assembly 14R is mounted to a side door disposed on a right side of a driver's seat in a right-hand drive vehicle, and a housing 16 made of a synthetic resin is carried on the base 15 so as to turn in forward and rearward directions of the vehicle.

A bracket 17 made of a synthetic resin is turnably carried on the base 15. The housing 16 covering the bracket 17 is attached to the bracket 17 by a plurality of screw members 18. A peripheral edge of a visor 19 extending into the housing 16 and attached to the housing 16 is coupled to an edge of an opening of the housing 16. A mirror 23R which is a rearview obtaining means capable of obtaining a view behind the vehicle is retained on a mirror holder 20 and disposed within the visor 19.

The mirror holder 20 comprises: a main holder portion 21 to an outer surface of which the mirror 23R is attached; and an inner holder portion 22 fixed to an inner surface of the main holder portion 21. The mirror holder 20 is carried by an actuator case 24 fixed to the bracket 17 so that the mirror holder 20 can swing forward and rearward as well as leftward and rightward.

The mirror holder 20 is swingably carried on the actuator case 24 at an intersection P between a first straight line LA extending vertically and a second straight line LB extending horizontally. First and second drive shafts 25A and 25B projects out of the actuator case 24 so as to move in their axial directions. First and second operating shafts 26A and 26B are connected to the mirror holder 20.

The first drive shaft 25A has an axis crossing at right angles the first straight line LA, is disposed below the intersection P, and connected at one end thereof to the mirror holder 20 so as to oscillate within a plane including the first straight line LA. The second drive shaft 25B has an axis crossing at right angles the second straight line LB, is disposed outside the intersection P, and connected at one end thereof to the mirror holder 20 so as to oscillate within a plane including the second straight line LB. The first operating shaft 26A is disposed on the first straight line LA on a side opposite from the first drive shaft 25A with respect to the intersection P, and connected at one end thereof to the mirror holder 20 so as to oscillate within a plane including the first straight line LA. The second operating shaft 26B is disposed on the second straight line LB on a side opposite from the second drive shaft 25B with respect to the intersection P, and connected at one end thereof to the mirror holder 20 so as to oscillate within a plane including the second straight line LB.

A distance between a connection of the first drive shaft 25A to the mirror holder 20 and the intersection P, and a distance between a connection of the second drive shaft 25B to the mirror holder 20 and the intersection P are set to be the same. Further, a distance between a connection of the first operating shaft 26A to the mirror holder 20 and the intersection P, and a distance between a connection of the second operating shaft 26B to the mirror holder 20 and the intersection P are set to be the same. Furthermore, all the distances between the connection of the first drive shaft 25A to the mirror holder 20 and the intersection P, between connection of the second drive shaft 25B to the mirror holder 20 and the intersection P, between the connection of the first operating shaft 26A to the mirror holder 20 and the intersection P, and between a connection of the second operating shaft 26B to the mirror holder 20 and the intersection P are set to be the same, whereby the inner holder portion 22 of the mirror holder 20 can be commonly used on left and right sides.

The following members are built in the actuator case 24: a first drive means 27AR which includes a first electric motor 29A and which drives the first drive shaft 25A in an axial direction in response to the operation of the first electric motor 29A, thereby tilting the mirror 23R forward and rearward; a second drive means 27BR which includes a second electric motor 29B and which drives the second drive shaft 25B in an axial direction in response to the operation of the second electric motor 29B, thereby tilting the mirror 23R leftward and rightward; a first sensor 28AR for detecting an angle of forward/rearward tilting of the mirror 23R within the plane including the first straight line LA in accordance with an axial position of the first operating shaft 26A; and a second sensor 28BR for detecting an angle of leftward/rightward tilting of the mirror 23R in accordance with an axial position of the second operating shaft 26B. Thus, the first and second drive shafts 25A and 25B and the first and second operating shafts 26A and 26B are operative associated with the drive means 27AR and 27BR.

Figure 3:
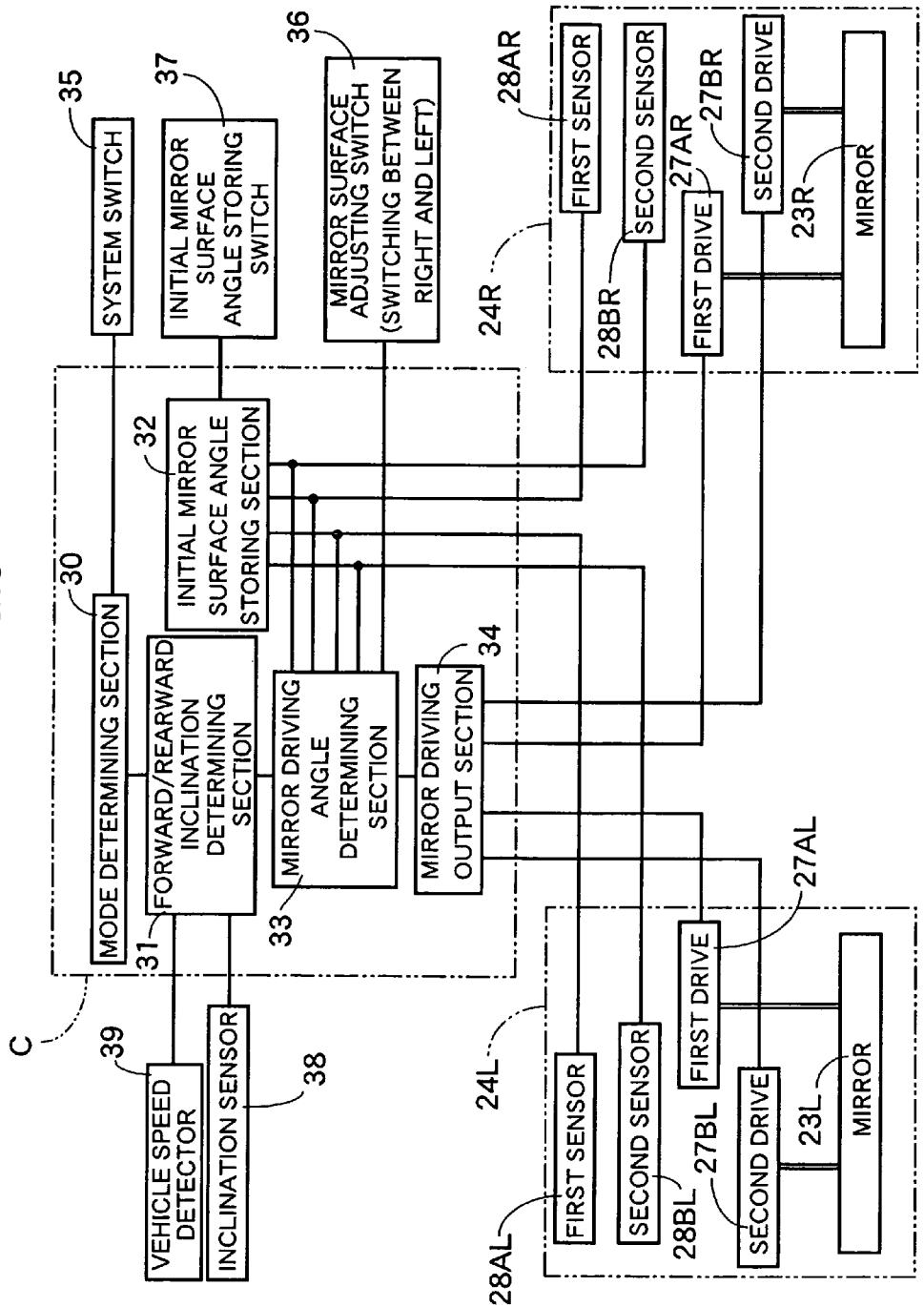
FIG. 3 is a block diagram showing the arrangement of a control system.

Referring to FIG. 3, the operations of the first and second drive means 27AR and 27BR of the right door mirror assembly 24R are controlled by a control means C, and angles of tilting of the mirror 23R obtained by the first and second sensors 28AR and 28BR of the right door mirror assembly 24R are input into the control means C.

As does the right door mirror assembly 24R, a left door mirror assembly 24L includes: a first drive means 27AL for driving and tilting the mirror 23L forward and rearward; a second drive means 27BL for driving and tilting the mirror 23L leftward and rightward; a first sensor 28AL for detecting an angle of forward/rearward tilting of the mirror 23L; and a second sensor 28BL for detecting an angle of leftward/rightward tilting of the mirror 23L. The operations of the first and second drive means 27AL and 27BL of the left door mirror assembly 24L are controlled by the control means C, and angles of tilting of the mirror 23L obtained by the first and second sensors 28AL and 28BL of the left door mirror assembly 24L are input into the control means C.

The control means C includes: a mode determining section 30; a forward/rearward inclination determining section 31; an initial mirror surface angle storing section 32; a mirror driving angle determining section 33; and a mirror driving output section 34. The mode determining section 30 determines whether or not the mode is one for storing initial tilting angles of the mirrors 23R and 23L by the operation of a system switch 35 for switching the system on and off. A mirror surface adjusting switch 36 is manually operated to switch the forward/rearward and leftward/rightward tilting angles of the mirrors 23R and 23L respectively on left and right sides. A drive signal for an angle determined by the mirror driving angle determining section 33 in response to the manual operation of the mirror surface adjusting switch 36 in such a manner to switch the forward/rearward and leftward/rightward tilting angles of the mirrors 23R and 23L respectively on the left and right sides, is output from the mirror driving output section 34. The first and second drive means 27AR and 27AL; 27BR and 27BL are operated by means of the drive signal output from the mirror driving output section 34, until the right and left door mirror assemblies 24R and 24L reach positions with arbitrary initial angles. Further, the initial mirror surface angle storing section 32 stores the initial angles of the mirrors 23R and 23L determined by the mirror surface adjusting switch 36 by operating an initial mirror surface angle storing switch 37.

A value detected by an inclination sensor 38 which is a forward/rearward inclination detecting means for detecting a forward/rearward inclination of the vehicle is input into the forward/rearward inclination determining section 31 of the control means C. The forward/rearward inclination determining section 31 determines that the vehicle has been inclined forward/rearward when the forward/rearward inclination of the vehicle detected by the inclination sensor 38 reaches a predetermined value or more. Corresponding to the degree of such an inclination, the first drive means 27AR and 27AL for driving and tilting the mirrors 23R and 23L in the forward/rearward direction in accordance with the result of the determination of angles for tilting the right and left door mirror assemblies 24R and 24L is operated by a signal output from the mirror driving output section 34, until the tilting angles determined by the mirror driving angle determining section 33 coincide with the angles detected by the first sensors 27AR and 27AL. Namely, the control means C operates the first drive means 27AR and 27AL of the door mirror assemblies 24R and 24L so that an angle of rearview obtained by each of the mirrors 23R and 23L is changed vertically, when the vehicle has been inclined forward/rearward.

A value detected by a vehicle speed detector 39 for detecting a travel speed of the vehicle is also input to the forward/rearward inclination determining section 31. During traveling of the vehicle, the height of the vehicle is varied little by little, and hence when it has been confirmed by a value detected by the vehicle speed detector 39 that the vehicle is traveling, the forward/rearward inclination determining section 31 ignores a variation of the value in a short time detected by the inclination sensor 38, and determines that the vehicle has been inclined forward/rearward based on a variation of the value in a relatively long time detected by the inclination sensor 38. In other words, the system functions to delay operation of the drive means dependent on a value detected by the forward and rearward inclination detection means.

Figure 4:
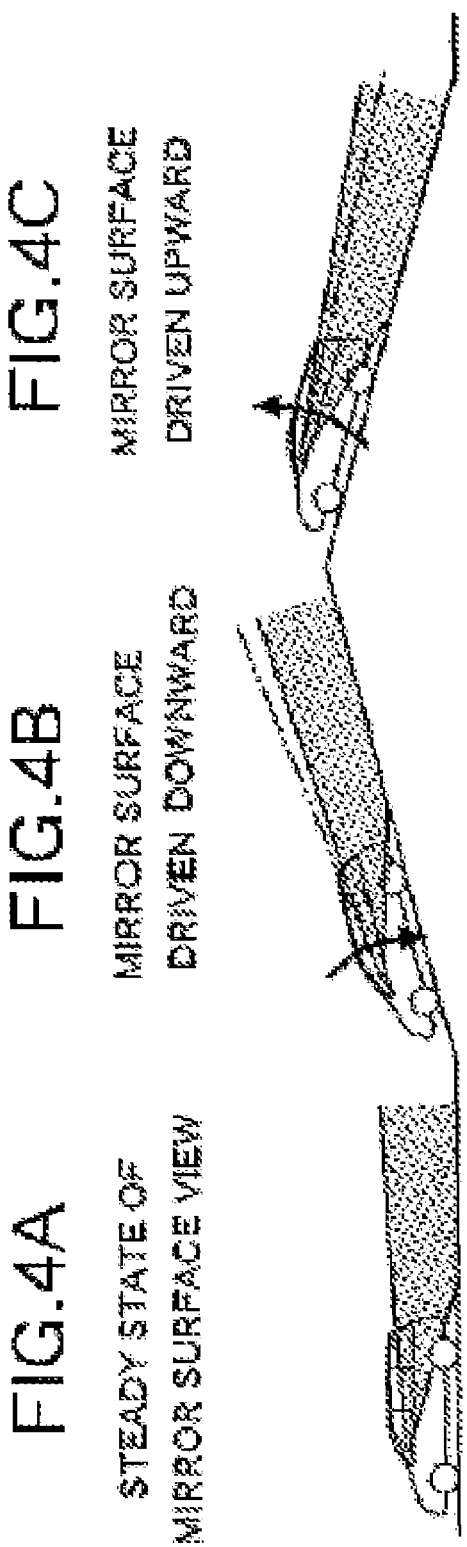
FIGS. 4A, 4B and 4C are illustrations each showing a view angle depending on the inclination of the vehicle in the case of a small amount of load carried on the vehicle.

When the weight of passengers and load carried on the vehicle is small, the mirrors 23R and 23L of the right and left door mirror assemblies 24R and 24L cannot be tilted during traveling of the vehicle on a horizontal road surface as shown in FIG. 4A. However, during traveling of the vehicle on a downhill road as shown in FIG. 4B, a view angle of a rearview provided by each of the mirrors 23R and 23L is offset upwards with respect to an appropriate view angle as shown by a two-dot dashed line by variations in heights of front and rear portions of the vehicle due to a variation in center of gravity of the vehicle, and hence the mirrors 23R and 23L are driven and tilted so as to displace the view angle downwards. Further, during traveling of the vehicle on an uphill road as shown in FIG. 4C, a view angle of a rearview provided by each of the mirrors 23R and 23L is offset downwards with respect to an appropriate view angle as shown by a two-dot dashed line, and hence the mirrors 23R and 23L are driven and tilted so as to displace the view angle upwards.

Figure 5:
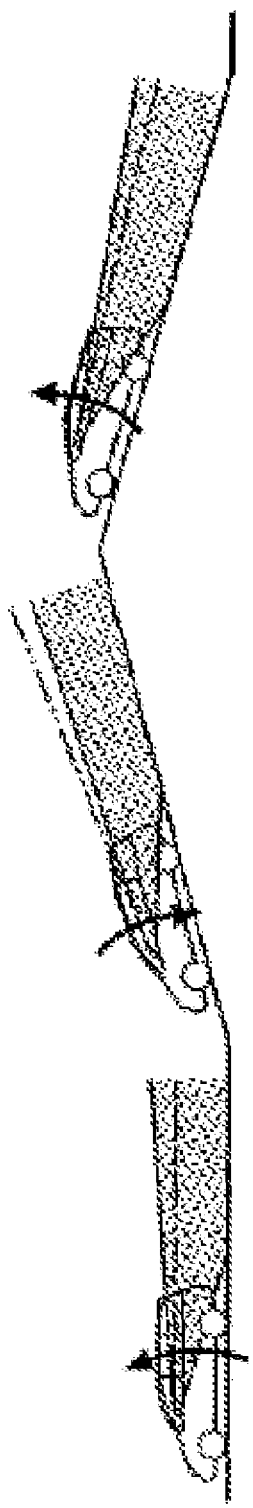
FIGS. 5A, 5B and 5C are illustrations each showing a view angle depending on the inclination of the vehicle in the case of a large amount of load carried on the vehicle.
Figure 6:
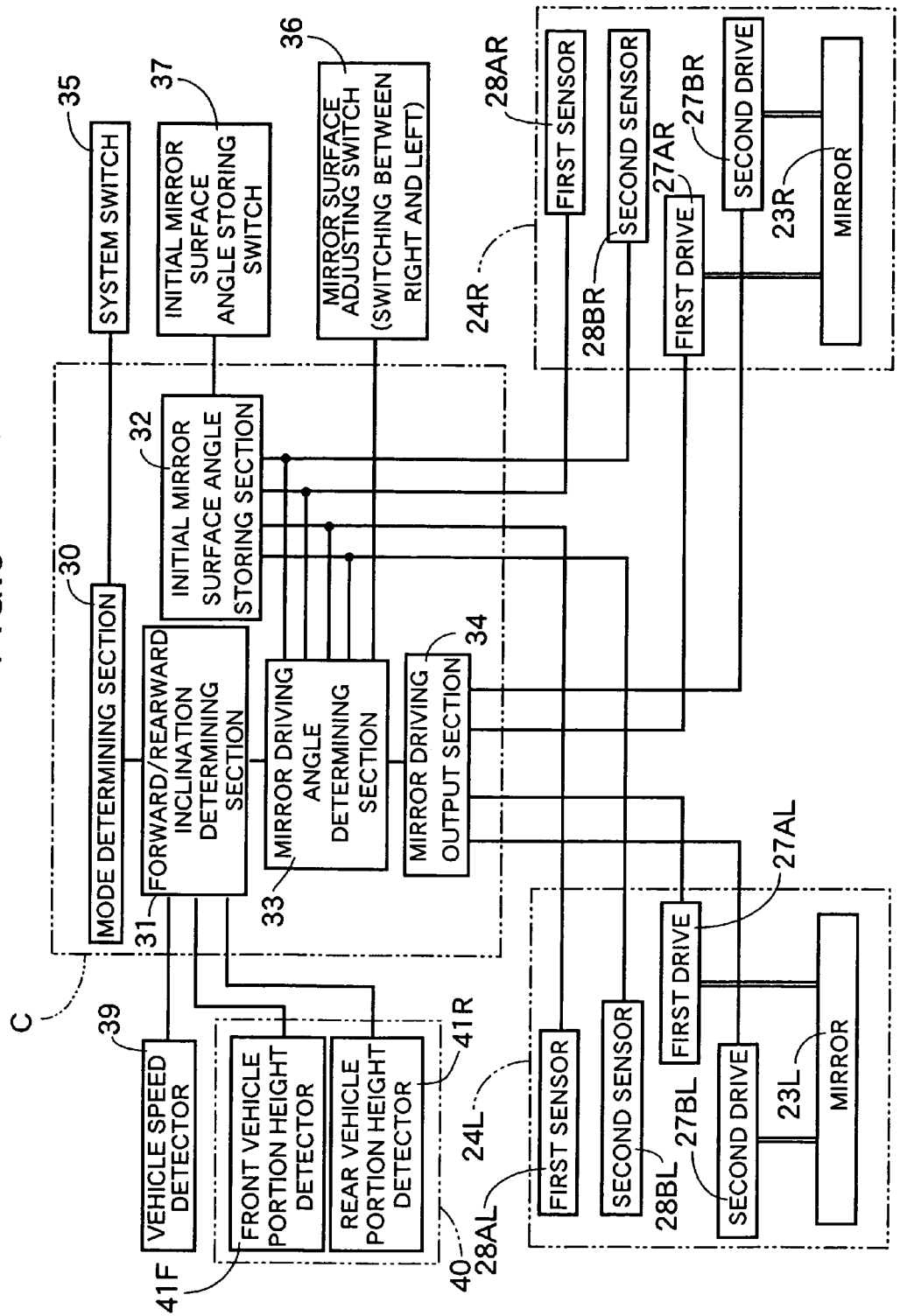
FIG. 6 is a block diagram similar to FIG. 3, but according to a second embodiment of the present invention.

When the weight of passengers and load carried on the vehicle is large, even during traveling of the vehicle on a horizontal road surface as shown in FIG. 5A, a view angle of a rearview provided by each of the mirrors 23R and 23L is offset downwards with respect to an appropriate view angle as shown by a two-dot dashed line, and hence the mirrors 23R and 23L are driven and tilted so as to displace the view angle upwards. During traveling of the vehicle on a downhill road as shown in FIG. 5B, a view angle of a rearview provided by each of the mirrors 23R and 23L is offset upwards with respect to an appropriate view angle as shown by a two-dot dashed line, and hence the mirrors 23R and 23L are driven and tilted so as to displace the view angle downwards. Further, during traveling of the vehicle on an uphill road as shown in FIG. 5C, a view angle of a rearview provided by each of the mirrors 23R and 23L is offset downwards with respect to an appropriate view angle as shown by a two-dot dashed line, and hence the mirrors 23R and 23L are driven and tilted so as to displace the view angle upwards.

The operation of the first embodiment will be described below. The control means C controls the operations of the first drive means 27AR and 27AL so as to vertically change the view angle of the rearview provided by each of the mirrors 23R and 23L of the right and left door mirror assemblies 24R and 24L, based on the value detected by the inclination sensor 38 for detecting the forward/rearward inclination of the vehicle. Therefore, even when the vehicle has been inclined forward/rearward due to the passengers and load carried on the vehicle and/or due to the traveling of the vehicle on a sloping road, the view angle of the rearview provided by each of the mirrors 23R and 23L of the right and left door mirror assemblies 24R and 24L can be controlled optimally.

In a second embodiment of the present invention, forward/rearward inclination detecting means 40 for detecting a forward/rearward inclination of a vehicle may comprise a front portion height detector 41F for detecting a height of a front portion of the vehicle from a stroke of a suspension in the front portion of the vehicle, and a rear portion height detector 41R for detecting a height of a rear portion of the vehicle from a stroke of a suspension in the rear portion of the vehicle.

Although the embodiments of the present invention have been described in detail, the present invention is not limited to the above-described embodiments, and various modifications in design may be made without departing from the subject matter of the invention defined in the claims.

For example, although the above embodiments have been described as using the mirrors 23R and 23L of the door mirror assemblies 24R and 24L as the rearview obtaining means for obtaining the rearview, the present invention is also applicable to a case where a rearview camera capturing a sight behind a vehicle is used as the rearview obtaining means.

What is claimed is:

1. A rearview correcting system for a vehicle, comprising:
   rearview obtaining means for providing a rearview to an occupant on a driver's seat, including a mirror;
   drive means for driving the rearview obtaining means to change a view angle of the rearview provided by the rearview obtaining means, wherein the driving means changes the view angle of the rearview in forward and rearward directions and also leftward and rightward directions;
   a mirror position detecting device;
   control means for controlling the operation of the drive means; and
   forward and rearward inclination detecting means for detecting a forward and rearward inclination of the vehicle, wherein
   the control means includes a section which stores an initial position of the rearview obtaining means;
   the control means controls the operation of the drive means so as to vertically change the view angle of the rearview obtaining means based on a value detected by the forward and rearward inclination detecting means; and
   the control means also delays the operation of the drive means dependent on the value detected by the forward and rearward inclination detecting means.

2. A rearview correcting system for a vehicle according to claim 1, wherein the control means delays the operation of the drive means by selectively ignoring variations of said value detected by the forward and rearward inclination detecting means depending on duration of said variations.

3. A rearview correcting system for a vehicle according to claim 1, wherein the control means delays the operation of the drive means by ignoring said value detected by the forward and rearward inclination detecting means when the value is less than a predetermined value.

4. A rearview correcting system for a vehicle according to claim 1, wherein the mirror faces rearwardly and four shafts are provided oscillatably on a front side of the mirror so as to be distanced from one another in a direction crossing a longitudinal direction of the vehicle, said four shafts extending in the longitudinal direction of the vehicle and operatively associated with the drive means.

5. A rearview correcting system for a vehicle according to claim 1, wherein the rearview obtaining means comprises a rearview mirror located on an exterior of a driver's side door and a rearview mirror located on an exterior of a passenger's side door of the vehicle.

6. A rearview correcting system for a vehicle according to claim 1, wherein the control means includes a mode determining section; a forward and rearward tilting determining section; a mirror driving angle determinining section; and a mirror driving output section.

7. A rearview correcting system for a vehicle according to claim 1, wherein the forward and rearward inclination detecting means comprises a front portion height detector for detecting a height of a front portion of the vehicle and a rear portion height detector for detecting a height of a rear portion of the vehicle.

8. A rearview correcting system for a vehicle according to claim 7, wherein the front portion height detector detects the height of the front portion of the vehicle from a stroke of a suspension in the front portion of the vehicle, and the rear portion height detector detects the height of the rear portion of the vehicle from a stroke of a suspension in the rear portion of the vehicle.

* * * * *